United States Patent

[11] 3,573,355

[72] Inventor Arthur A. Cavelos
North Syracuse, N.Y.
[21] Appl. No. 814,949
[22] Filed Apr. 10, 1969
[45] Patented Apr. 6, 1971
[73] Assignee General Electric Company

[54] TELEVISION RECEIVER WITH APPARATUS FOR EFFECTING AND MAINTAINING OPTIMUM TUNING
9 Claims, 7 Drawing Figs.

[52] U.S. Cl. .......... 178/5.8, 325/330, 325/33.1, 325/423, 325/467
[51] Int. Cl. .......... H04n 5/50, H04b 1/16, H04b 1/68
[50] Field of Search .......... 178/5.8, 5.8 (AFC), (6 TUNING); 325/467, 330, 331, 423

[56] References Cited
UNITED STATES PATENTS

| | | | |
|---|---|---|---|
| 2,245,710 | 6/1941 | Rado | 325/423 |
| 3,519,939 | 7/1970 | Tashima | 325/318 |

OTHER REFERENCES
" All Channel TV Tuner" by E.J. Schultz Radio-Electronics May 1949 pages 24 & 25

*Primary Examiner*—Richard Murray
*Assistant Examiner*—George G. Stellar
*Attorneys*—Francis H. Boos, Jr., Harry B. O'Donnell, III, Harry F. Manbeck, Jr., Frank L. Neuhauser, Oscar B. Waddell and Joseph B. Forman

ABSTRACT: A television receiver includes an automatic frequency control (A.F.C.) circuit having a frequency dependent response characteristic which is separately adjustable by a user or repairman for each incoming radio frequency television channel. The modulated television video and sound carriers for any selected channel are reduced in frequency to the intermediate frequency (I.F.) range by a heterodyning operation, and the A.F.C. circuit automatically adjusts and maintains the composite I.F. television signal in a preferred frequency relationship with respect to the pass band of an intermediate frequency amplifier. The receiver thus provides and maintains the best possible reception for each received channel having regard to the particular local reception conditions prevailing at the receiver and the subjective preferences of the viewer.

INVENTOR.
Arthur A. Cavelos
BY
Davis, Hoxie, Faithfull & Hapgood
ATTORNEYS.

INVENTOR.
Arthur A. Cavelos
BY
Davis, Hoxie, Faithfull & Hapgood
ATTORNEYS.

TELEVISION RECEIVER WITH APPARATUS FOR EFFECTING AND MAINTAINING OPTIMUM TUNING

This invention relates to television receivers and, more specifically, to a television receiver which includes improved automatic frequency control circuitry for providing and maintaining optimum reception for each modulated radio frequency carrier (channel) under the constraints imposed by local reception conditions prevailing at the receiver for each channel, and having regard for subjective viewer preferences.

Many prior art television receivers have included a fine tuning control to permit a viewer to separately adjust the response of the receiver for each received channel. Thus, picture and sound programs which most closely meet the viewer's preferences are produced within bounds imposed by local signal reception conditions for that particular channel. The signal reception conditions will, in general, vary from channel to channel, being dependent upon such principal factors as the distance between the various station transmitters and the receiver (the signal strength is generally inversely proportional to the square of the distance) which may interfere with line of sight transmission or create multipath ("ghost") problems.

The receiver fine tuning control has been typically employed to slightly vary the frequency of a local oscillator, thereby producing a like shift in the frequency spectrum of the modulated intermediate frequency I.F. video and sound carriers at the output of a receiver heterodyning circuit. This shifting of the I.F. signal modulation spectrum as it is supplied to, and passes through the fixed frequency dependent pass band of a receiver I.F. amplifier produces the desired change in the receiver response by emphasizing certain frequency components of the I.F. modulation signals, while deemphasizing or attenuating other frequencies together with spurious noise signals of the attenuated frequencies.

However, because the above adjustment in such prior art receivers is essentially dependent upon the difference in frequency between the broadcast video carrier wave and the sinusoidal output voltage from the local oscillator, this being inherent in the heterodyning process, the receiver will operate out of the desired adjustment when the frequency of either the local oscillator or the received television signal deviates from its intended value. Such a frequency drift commonly exists, for example, when the temperature about the local oscillator changes, as when the receiver is first turned on.

It is therefore an objective of the present invention to provide an improved television receiver.

More specifically, an objective of the present invention is the provision of a television receiver employing improved automatic frequency control circuitry which is separately adjustable for each television channel to provide and maintain optimum receiver reception, subject to local reception limitations and having regard to viewer preferences, as each channel is tuned in by a channel selector switch.

The above and other objectives of the present invention are realized in a specific, illustrative television receiver which employs an automatic frequency control arrangement for selectively positioning and maintaining an intermediate frequency television signal in a preferred frequency relationship for optimum reception with respect to the frequency dependent band pass characteristic of an intermediate frequency amplifier. The frequency spectrum of the composite I.F. signal relative to the fixed I.F. amplifier pass band is separately adjustable for each received television radio frequency (R.F.) channel, with synchronized switching apparatus being provided to automatically institute the proper receiver I.F. tuning adjustment as each channel is from time to time selected for viewing by a station selector switch. The proper receiver adjustment is effected by a variation in the output voltage—input I.F. video carrier frequency transfer characteristic of an automatic frequency control A.F.C. feedback circuit path, with the A.F.C. structure also being operative to continuously maintain the desired adjustment.

The receiver includes a radio frequency amplifier, a mixer, a voltage controlled local oscillator, and an I.F. amplifier to form a heterodyning configuration for producing a video (main) I.F. carrier, amplitude-modulated with picture information, and an I.F. sound carrier, frequency modulated with sound information. The I.F. picture and sound carriers, and their modulations, essentially comprise replicas of the corresponding modulated radio frequency signals broadcast by the particular station selected for viewing by the receiver channel selector switch. The selector switch includes multiple contacts to connect the appropriate station tuning reactive circuit components into the radio frequency amplifier and the local oscillator in the manner long known.

The I.F. signal, after passing through the I.F. amplifier, is supplied to the remainder of the receiver for reproduction of the picture and sound programs. The I.F. signal, and most importantly its video carrier component, is supplied to a frequency dependent control circuit which supplies to the voltage-controlled local oscillator an output voltage that depends in amplitude and, by design choice possibly also in polarity, upon the frequency of the intermediate frequency video carrier.

The control circuit includes a plurality of adjustable circuit components, a different one or group of which is electrically connected into an active condition by additional contacts on the station selector switch for each setting (channel selection) of the switch. Each of the variable elements, after being once adjusted when the television receiver is aligned at its intended place of operation, is functionally operative to impart a particular transfer characteristic to the control circuit in terms of the control voltage output versus input I.F. video carrier frequency.

The above-described arrangement forms a complete automatic frequency control feedback circuit and effects automatic frequency control action. More specifically, the intermediate frequency video carrier, and thereby also the remainder of the composite television signal supplied to the following portion of the receiver for processing and reproduction, will be maintained constant in frequency. The particular value for the intermediate frequency video carrier, in turn, will depend upon the particular variable element (and its adjustment) which has been connected into the control circuit by the station selector switch.

The variable element for each channel is initially adjusted to provide a viewer with optimum reception in accordance with his preferences and the local reception condition for that transmission. Thereafter, this optimum reception alignment condition for the receiver will automatically be effected and maintained each time that station is selected for reception.

A complete understanding of the present invention and of the above and other features and advantages thereof may be gained from a consideration of the following detailed description of an illustrative embodiment thereof presented hereinbelow in conjunction with the accompanying drawing, in which.

Figure 3:
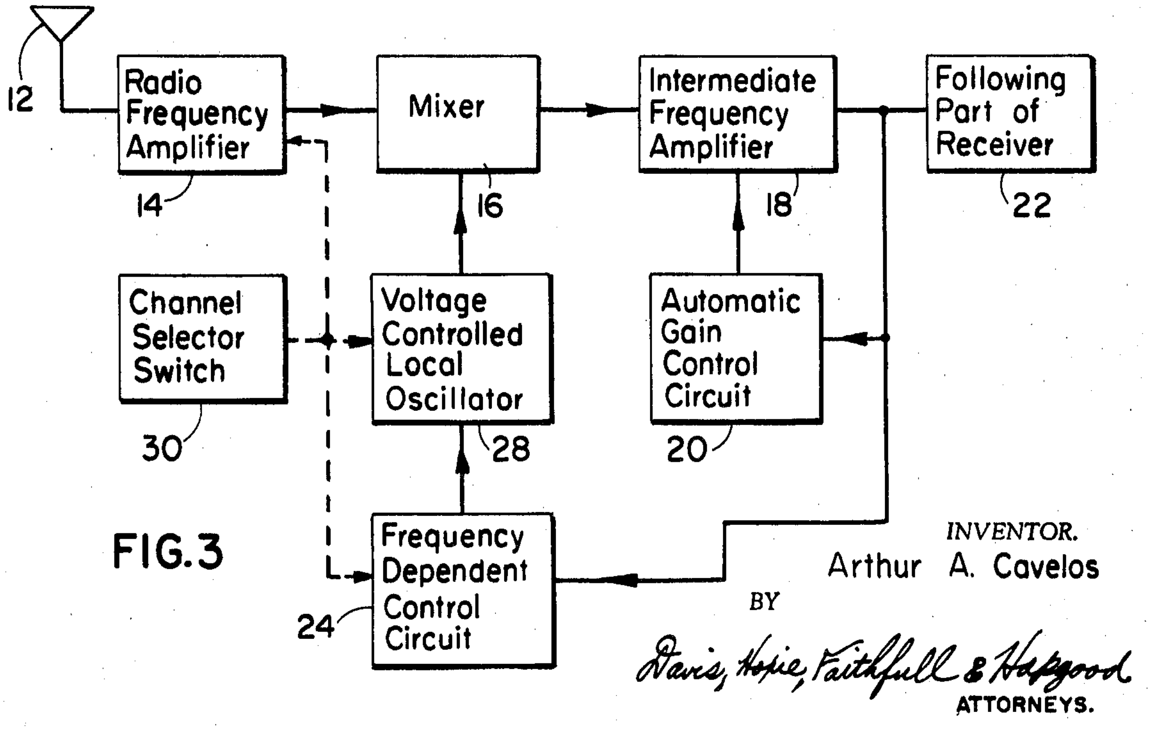
Figure 4:
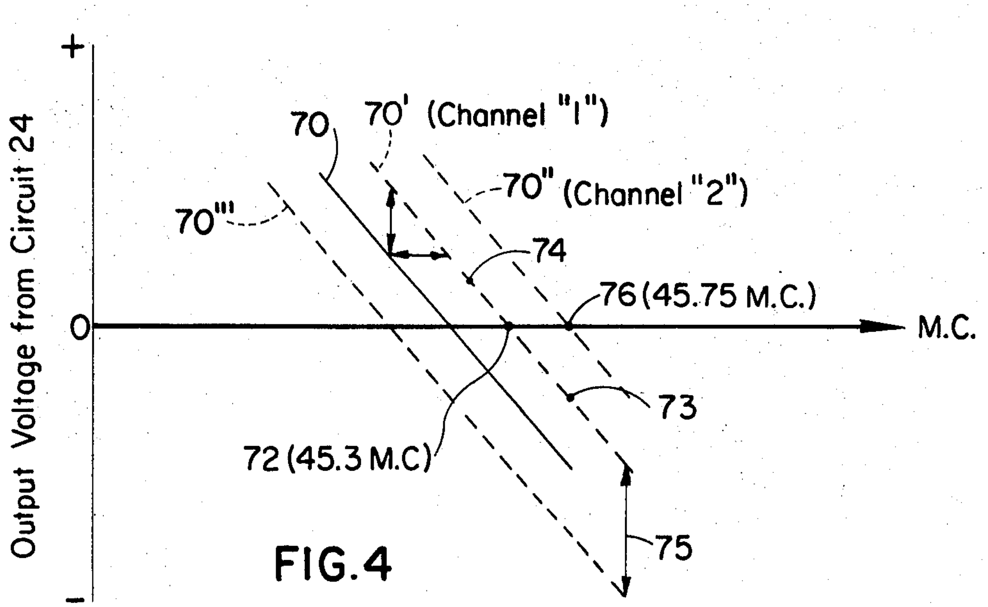
Figure 5A:
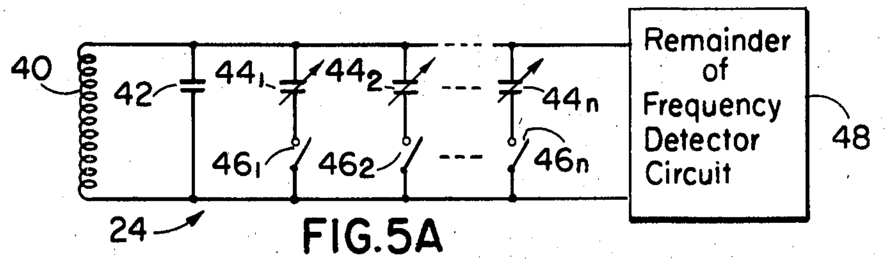
Figure 5B:
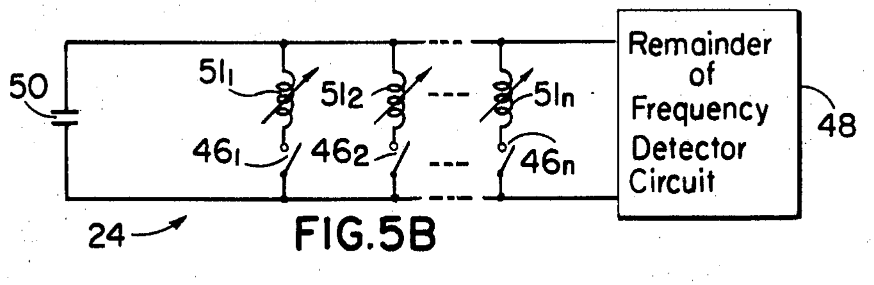
Figure 5C:
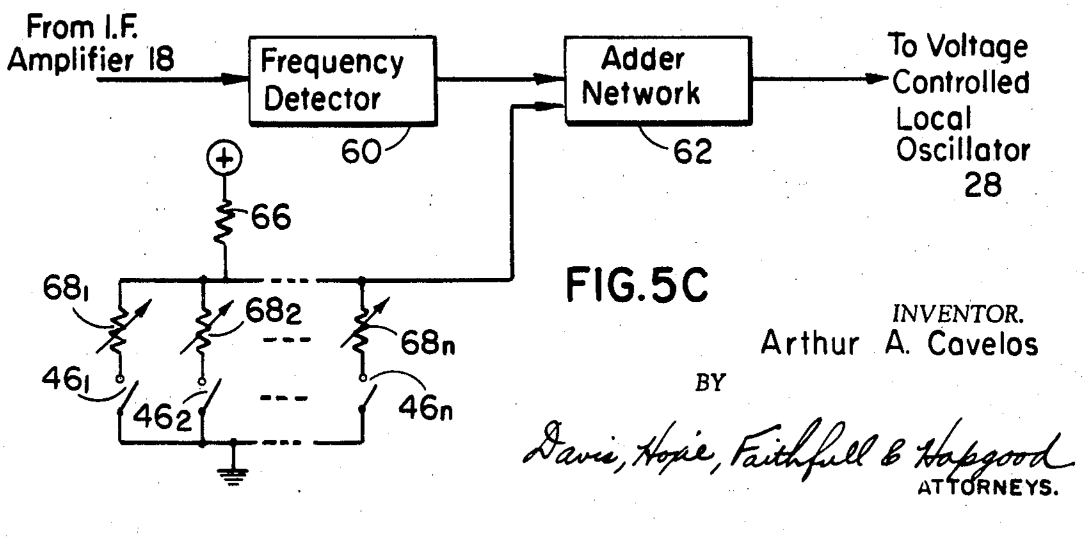

FIG. 3 comprises a block diagram of a television receiver embodying the principles of the present invention;

FIG. 4 depicts several output voltage-input frequency transfer characteristics selectively exhibited by a control circuit 24 included in the arrangement of FIG. 3 and;

FIGS. 5A through 5C illustrate alternative specific embodiments for the control circuit 24 of FIG. 3.

Figure 1:
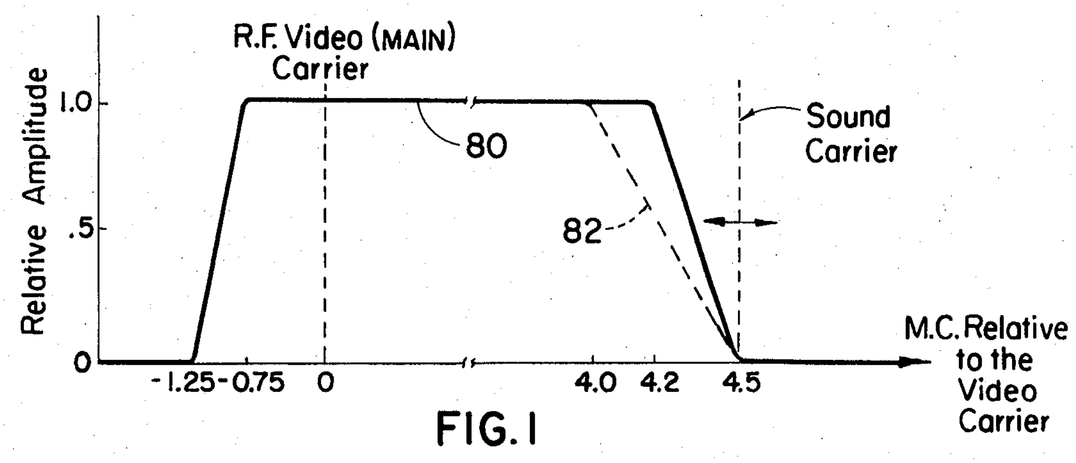
FIG. 1 depicts the transmission frequency spectra for television signals in accordance with the prescribed American color and monochrome systems.

Referring now to FIG. 1, there is shown a curve 80 which depicts the prescribed transmission pattern for any radio frequency color television signal. The frequency values given for the abscissa in FIG. 1 are measured relative to the main, or video carrier wave which has been assigned a relative frequency of zero megacycles (mc.). Video information up to 4.5 megacycles amplitude modulates the main carrier, with only a vestigial or partially suppressed lower side band being emitted by the broadcasting station. It may be observed from FIG. 1 that low frequency video signals up to .75 megacycles are transmitted on a double side band basis, with each of the side bands being transmitted at full strength (1.0 relative amplitude). From .75 to 4.2 megacycles (4.0 megacycles for monochrome transmission as indicated by the dashed line 82 in FIG. 1), the upper side band is transmitted at full strength, with a progressively weakened lower side band being present for video modulation in the frequency range .75—1.25 megacycles. The upper side band in turn becomes progressively attenuated for video frequencies starting at 4.2 megacycles (color) or 4.0 megacycles (monochrome), and is eliminated entirely above 4.5 megacycles. A frequency modulated sound carrier, deviated in frequency about 4.5 megacycles, is also broadcast at the transmitter and completes the composite television signal. The specific sound signal frequency spectrum is of incidental interest only for the present invention, and is omitted throughout the drawing.

The curve 80 (as modified by a line 82 for monochrome transmission) simply indicates the relative strengths at which those video modulation signals, actually produced responsive to a particular image scanning operation, will be transmitted. This curve does not imply, for example, that all television video signals have maximum amplitude information throughout the range from 0 to 4.2 (color) or 4.0 (monochrome) megacycles. To the contrary, the video spectrum will, in general, consist of a relatively large signal content at low video frequencies which corresponds to coarse picture information (area shapes) of a scanned image to be transmitted, and relatively little high frequency video information (aside from the color modulation signals) which corresponds to the fine detail content of the scanned image.

At a television receiver, the radio frequency television signal is selected and reduced in frequency to the intermediate frequency range by a heterodyning process, and passed through an I.F. amplifier. The frequency pass band characteristic for a good quality color receiver is indicated by the curve 90 in FIG. 2, with the pass band being narrowed for a like quality monochrome receiver as indicated by the dashed line 92. Because the local oscillator in a television receiver operates at a higher frequency than the selected radio frequency carrier, the upper side band of the R.F. carrier becomes the lower side band of the intermediate frequency carrier during the heterodyning operation, and vice versa. Accordingly, the pass band of the I.F. amplifier is conventionally shown with frequency decreasing to the right, as in FIG. 2, to facilitate an inspection of the manner in which the television signal of FIG. 1 passes through the amplifier. This side band inversion is of no further interest here.

Figure 2:
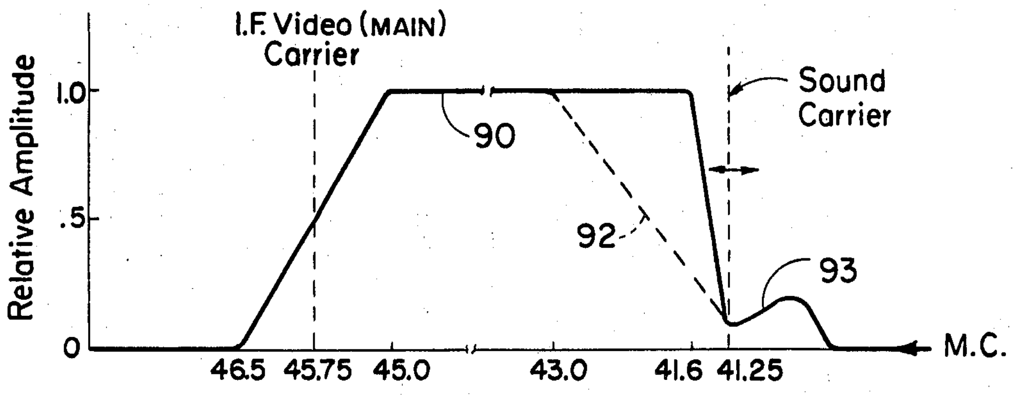
FIG. 2 illustrates frequency dependent pass band characteristics for receiver intermediate frequency amplifiers of good quality for color and monochrome reception.

As indicated in FIG. 2, the I.F. amplifier passes signals between 45.0 megacycles and 41.6 (color) or 43.0 megacycles (monochrome) with full (1.0 relative) amplitude, and attenuates video signals between these limits and 46.5 megacycles on one side and 41.25 megacycles on the other.

When a strong television signal is being received, the preferred frequency position for the intermediate frequency replica of the radio frequency signal is to have the I.F. video carrier at 45.75 megacycles, which places the I.F. sound carrier at 41.25 megacycles, this being the same intercarrier frequency difference of 4.5 megacycles as existed at the transmitter. This frequency relationship is preferred since the largest possible band of video frequencies, namely, all those frequencies between 0 and 4.15 megacycles (color) or 2.75 megacycles (monochrome) will be uniformly passed through the amplifier at full relative strength.

To illustrate this, it is clear from an examination of FIGS. 1 and 2 that the upper side bands corresponding to all video modulating signal frequencies between .75 and 4.15 mc. (color) or 2.75 mc. (monochrome) removed from the I.F. video carrier were broadcast at full strength (1.0 relative amplitude), and pass at full (1.0) strength through the I.F. amplifier. The lower side bands associated with a portion of these video frequencies are transmitted in reduced vestigial form, and do not pass through the I.F. amplifier which blocks all frequencies 46.5 megacycles and above. Thus, the lower transmitted side band for all video signal frequencies above .75 mc. is rejected by the I.F. amplifier.

For all video frequencies between 0 and .75 megacycles, both side bands are transmitted at full strength, and both side bands are attenuated at the receiver, although to a different degree. Note that the I.F. video carrier, at the preferred strong signal position of 45.75 megacycles, is half way up the left slope of the amplifier response characteristic 90 in FIG. 2, which corresponds to a 50 percent attenuation (0.5 relative amplitude). In the detection of double side band amplitude modulation, the amplitude of the resulting output signal is given by the sum of the amplitudes of the two side bands (this may be easily verified from a consideration of a vector representation for amplitude modulation). Note also from FIG. 2 that, for all video frequencies up to .75 megacycles, the associated upper and lower amplitude modulation side bands are equally spaced from the carrier and therefore have a combined strength which for every case exactly equals full (1.0) relative amplitude.

Thus, it has been shown by the foregoing that the preferred frequency positioning for the I.F. signal relative to the amplifier characteristic (strong signal condition), as shown in FIG. 2, passes all video modulation frequencies with full and equal response down to the amplifier cutoff frequency (41.6 mc. color; 43.0 mc. monochrome), and then passes the remaining signals to 41.25 megacycles, corresponding to video information up to 4.5 megacycles, with progressively diminishing strength.

As observed above, positioning of the video carrier at 45.75 megacycles is preferable for the strong signal condition where sufficient low frequency video strength exists to adequately define the course and intermediate features of the scanned image, and where the high frequency, fine detail defining video energy, although typically present at a much lower level than the low frequency information, is sufficiently greater in amplitude than the extraneous receiver noise of the corresponding high frequency range to warrant reproduction.

To accommodate television signals which may depart from the above-considered strong signal level, i.e., for weak or marginal signal reception conditions, a television receiver in accordance with the present invention is provided with apparatus for selectively and automatically shifting the composite I.F. television signal downward in frequency (to the right in FIG. 2) relative to the frequency positioning shown in FIG. 2 as preferred for the strong signal condition. Moreover, the composite I.F. television signal for each received channel is maintained at an optimum position which may be different for each received channel.

As the video carrier frequency is moved to the right in FIG. 2, the low frequency video signals receive relatively more amplification in the I.F. amplifier since the combined amplitude of the two amplitude modulation side bands for such frequencies will now be greater than the 1.0 "full" relative amplitude while some high frequency video information will be attenuated or eliminated by the sloping I.F. amplifier band pass characteristic at the right side of FIG. 2.

This shifting of frequencies improves the signal-to-noise ratio of the video modulation within the receiver, and therefore improves receiver operation, through two related actions. First, the video carrier and the low frequency video modulation signals about the video carrier tend to increase in amplitude. An automatic gain control circuit connected to the I.F. amplitude will reduce the amplification factor thereof such that the video carrier level will be maintained nearly constant. This reduced amplification factor decreases the noise output of the amplifier by providing less amplification of the input noise signals while maintaining the output information signal level constant, thereby increasing the receiver signal-to-noise ratio. When no automatic gain control circuit is included in a receiver, this extra amplification for the important low frequency video signals is a desirable end in itself.

Then also, the effective bandwidth of the video signal is reduced as more high frequency video signals are attenuated or eliminated to afford room within the I.F. amplifier band pass for the additional vestigial, lower side bands. As a portion of the relatively weak high frequency video signals are reduced or eliminated from the output of the I.F. amplifier, noise of a like frequency content is also effectively reduced or eliminated from the receiver thereby further improving the signal-to-noise ratio.

It may be observed from FIGS. 1 and 2 that, for weak signals, some continuous improvement in signal-to-noise ratio, at a sacrifice of high frequency (and possibly color) information, may be derived as the video carrier is shifted downward two megacycles, or to 43.75 mc. This adjustment process may be viewed for the weak reception condition as a progressive trade off of fine picture detail, a luxury that may not be possible for weak signals, in favor of coarse or intermediate image detail such that the viewer can select, according to his taste, the best combination of adequate picture definition with the least amount of offensive high frequency noise.

The I.F. pass band characteristics of FIG. 2, typical of present day I.F. amplifiers, exhibit a rising portion 93 below 41.25 mc. As the I.F. television signal is shifted to the right in FIG. 2, the modulated sound carrier moves up on the amplifier response portion 93, and thus is available, in enhanced strength, for demodulation and reproduction by the receiver. In physical terms, this rising characteristic portion 93 is produced by the complex intercoupling of resonant sound trap circuitry with tuned I.F. amplifier components. Thus, the sound information is preserved during the frequency shifting operation.

A particular receiver circuit for automatically effecting and maintaining the above shifting adjustment process to attain a preferred receiver response for each television channel is shown in FIG. 3 and comprises an antenna system 12 for coupling radio frequency television signals to an R.F. amplifier 14. A selected one of the radio frequency television signals is supplied by the amplifier 14 to a mixer 16, as is the output of a voltage controlled local oscillator 28. A channel selector switch 30 includes a plurality of switching contacts to select one of the plurality of transmitted R.F. television signals in the known manner by connecting particular reactive elements, associated with the desired channel, into the amplifier 14 and into the oscillator 28. This tunes the amplifier 14 to pass only the desired radio frequency composite television signal, and tunes the local oscillator to a frequency an amount above that of the desired R.F. main carrier signal given by the approximate receiver intermediate frequency.

One constituent part of the output of the mixer 16 is the composite selected television video and sound carriers, with their attendant modulation products, reduced in frequency to the intermediate frequency range. This spectrum of I.F. frequency signals is selected and amplified by an amplifier 18 which may advantageously embody the frequency pass band characteristic shown in FIG. 2 for a color or monochrome receiver as appropriate. The amplified I.F. signal is supplied to the following part of the overall receiver 22 which performs all the necessary offices to process and reproduce the picture and sound programs.

The I.F. signal is also connected to a frequency dependent control circuit 24 which generates an output voltage having an amplitude and polarity which varies with the frequency of the I.F. video carrier. The control circuit 24 may advantageously comprise, in principal part, a ratio detector, slope detector, limiter-discriminator, or other like well-known frequency demodulation arrangement each of which will exhibit a transfer characteristic, or input-output relationship, between the frequency of the input I.F. video carrier and the amplitude and polarity of an output voltage which depends thereon. FIG. 4 depicts such a transfer characteristic 70, with the curve 70 in fact comprising one useful single valued portion of some more complex input frequency-output voltage relationship. The voltage output of the circuit 24 is supplied to the voltage controlled local oscillator 28 which assumes a particular output oscillation frequency depending upon the amplitude and polarity of the control voltage supplied thereto. In particular, for the negative sloping characteristic of FIG. 4, the oscillator 28 must be adjusted to decrease in frequency when a voltage below that corresponding to an intended operating point on the characteristic 70 is supplied by the circuit 24, and increase in frequency responsive to the circuit 24 supplying a voltage above that corresponding to the desired operating point. For practical considerations, zero output voltage from the circuit 24 is a desirable operating point. Accordingly, the voltage controlled local oscillator 28 is adapted to increase or decrease its output frequency when the voltage output of the control circuit 24 is positive or negative, respectively.

One embodiment for the frequency dependent control circuit 24 in accordance with the principles of the present invention is shown in FIG. 5A, and includes an inductor 40 and a capacitor 42 which define a parallel resonant circuit configuration forming a portion of the above enumerated frequency detecting structures. The remainder of the overall ratio detector or other frequency detector circuit is generally represented as a functional block 48.

A plurality of capacitors $44_1$, $44_2$ ... $44_n$ equal in number to the number of television channels are arranged to be connectable in parallel with the capacitor 42. Connected in series with each of the capacitors 44 is a switch 46 which is controlled by, or formed of contacts directly included on the selector switch 30 so that only one of the switches 46 is closed at any given time. The identity of the particular closed switch 46 depends upon the setting of the selector switch 30 corresponding to the channel selected for reception. Accordingly, operation of the switches 46 is synchronized with the station tuning of the R.F. amplifier 14 and the local oscillator 28. The functional operation of the control circuit 24 of FIG. 5A will be considered below.

Finally, the receiver shown in FIG. 3 includes an automatic gain control circuit 20 which responds to the relative amplitude of the I.F. video carrier by appropriately adjusting the gain to the I.F. amplifier 18. In particular, the automatic gain control circuit 20 keeps the I.F. video carrier, and thereby also the remainder of the I.F. television signal supplied to the following receiver portion 22, at a near constant amplitude by increasing the gain of the I.F. amplifier 18 when the I.F. carrier tends to decrease, and by lowering the gain of the amplifier 18 when the I.F. video carrier output from the amplifier tends to increase in size. Specific embodiments of the R.F. and I.F. amplifiers 14 and 18, the mixer 16, the voltage controlled local oscillator 28, the selector switch 30 and the automatic gain control circuit 20 are well known to those skilled in the art, and will not be considered further herein.

With the above-described structure in mind, an illustrative sequence of operation for the receiver will now be described. When the receiver is first placed in service at a desired location, and with a particular quality antenna system 12, the selector switch 30 is set to any received channel, e.g., a channel "1." Accordingly, contacts controlled by the selector switch 30 connect the appropriate reactive elements into the R.F. amplifier 14 and the local oscillator 28 such that the composite television signal broadcast by the channel "1" transmitter is reduced to intermediate frequency range by heterodyning action in the mixer 16, and selected and amplified by the I.F. amplifier 18.

The selector switch also closes one of the switches 46 in the frequency dependent control circuit 24 of FIG. 5A, e.g., the switch $46_1$, thereby connecting the variable capacitor $44_1$ in parallel with the capacitor 42. The capacitor $44_1$ is then adjusted to develop the best possible reception for channel "1" subject to viewer preferences.

In overall terms, the capacitor $44_1$, is adjusted to provide the best frequency relationship for the I.F. signal for channel "1" relative to the band pass of the I.F. amplifier 18 such that optimum reception will be effected in accordance with the principles discussed above with respect to FIGS. 1 and 2. Regarding specific circuit operation, adjustment of the capacitor $44_1$ has the electrical effect of changing the resonant frequency of the ratio detector or other frequency detecting circuit, thereby sliding the transfer characteristic 70 for the circuit 24 horizontally in FIG. 4, e.g., to a position 70'.

The particular transfer function exhibited by the circuit 24 determines the specific intermediate frequency of the video carrier, and thereby also the position of the I.F. modulation spectra relative to the pass band of the I.F. amplifier 18. More specifically, the I.F. video carrier will be set and maintained by automatic frequency control feedback action at a frequency corresponding to the design operating point for the transfer characteristic 70' which, for the above assumed operating condition, is zero volts. The output signal from the circuit 24 will automatically vary the frequency output of the local oscillator 28 such that the proper intermediate frequency for the composite I.F. signal is both attained and, moreover, constantly maintained.

To illustrate this mode of operation, and assuming channel "1" to be a station received with only fair strength, the transfer characteristic 70' for this station has an operating point 72 at the zero output voltage level which may illustratively correspond to a frequency of 45.3 mc. This, in turn, will correspond to the I.F. video carrier being positioned at 45.3 mc. see generally FIG. 2 for the significance of such a carrier position. If the I.F. video carrier ever tends to increase in frequency above this rate for any reason, e.g., towards a point 73 on the characteristic 70' in FIG. 4, a negative voltage is supplied to the local oscillator 28 to reduce its output frequency, and thereby also the frequency of the I.F. video carrier. If the overall gain of the composite automatic frequency control feedback circuit is relatively large (the usual practice), the final corrected frequency of the I.F. video carrier will be reset very close to 45.3 mc.

Correspondingly, if the I.F. video carrier frequency tends to decrease, as towards a point 74 in FIG. 4, the control circuit 24 generates a positive output voltage which increases the frequency of the local oscillator 28, and thereby also the I.F. video carrier such that the I.F. video carrier signal is again maintained at the selected 45.3 mc. value. Thus, a proper adjustment for the capacitor $44_1$ will result in a desired frequency relationship between the intermediate frequency television signal for channel "1" and the pass band of the I.F. amplifier 18, and this relationship, corresponding to optimum reception, will be maintained by automatic frequency control action.

After channel "1" has been adjusted, the selector switch 30 is turned to the next received channel, e.g., channel "2." Only a corresponding capacitor 44, e.g., the capacitor $44_2$ will be connected in parallel with the capacitor 42 at this time, since only the switch $46_2$ is closed by the channel selector switch 30. Assuming channel "2" to be a strong station, the capacitor $44_2$ may be adjusted to produce a transfer characteristic 70'' shown in FIG. 4, with the frequency regulation point 76 corresponding to 45.75 megacycles, as explicitly shown in FIG. 2.

All of the remaining channels are then adjusted in sequence, such that the capacitors 44 produce a family of optimum transfer characteristics 70 (FIG. 4) each of which is associated with a particular station or group of stations. These characteristics 70 may all differ, or there may be an identity where two or more channels have a like optimum reception adjustment.

After the set has once been adjusted in the above manner under local conditions and subject to specific viewer preferences, the appropriate one of the transfer characteristics 70 of FIG. 4 will automatically be connected into service each time a particular station is selected for viewing, this being accomplished by an electrical selection of the proper adjusted capacitor 44 by the selector switch 30. This will automatically adjust the receiver for the desired optimum response in accordance with the reception principles considered above, having regard to the positioning of the I.F. signal relative to the I.F. pass band and the operation of the automatic gain control circuit 20, and will maintain the desired receiver response through automatic frequency control operation.

The frequency dependent control circuit 24 can take on other specific constructions. For example, comparing the specific embodiments for the circuit 24 shown in FIGS. 5A and 5B, it is apparent that one adjustable inductive tuning coil 51 can be associated with each received channel and used to horizontally shift the transfer characteristic 70 of FIG. 4 by tuning a capacitor 50 to resonate at a desired intermediate video carrier frequency.

Another specific embodiment for the circuit 24 is shown in FIG. 5C, and operates by vertically rather than horizontally shifting the transfer characteristics 70 of FIG. 4 to develop the requisite family of characteristics. Note in FIG. 4 that the transfer characteristic 70 can be changed to the curve 70' by a horizontal shift as disclosed above (corresponding to a change in value for a reactive component as in the embodiments of FIGS. 5A and 5B), and that the same result can be obtained by vertically raising the curve 70. This vertical shift may be produced by adding DC voltage to the output of a frequency detector circuit which maintains a fixed transfer characteristic. The family of transfer characteristics can be developed by simply varying the value of the DC voltage for each channel.

In the detector 24 embodiment shown in FIG. 5C, a frequency detector 60 exhibits a fixed transfer characteristic, e.g., the characteristic 70''' of FIG. 4, with the output voltage from the detector 60 being supplied to a conventional adder network 62. In the adjustment of the detector control circuit 24 of FIG. 5C, the station selector switch 30 is tuned to channel "1," thereby closing only the switch $46_1$. The resistor 68 is then adjusted such that the composite circuit 24 exhibits the transfer characteristic 70', this being electronically accomplished by adding sufficient DC voltage (an amount given by vector 75 in FIG. 4) to the curve 70''' to move this curve vertically to the proper position 70'. That is, the adder 62 vertically displaces the sloping voltage-frequency transfer characteristic of the detector 60 (the curve 70''') by an amount (75) given by the output voltage present at the junction of the resistors 66 and $68_1$ which form a voltage divider network. The remaining resistors $68_2$ ... $68_n$ are subsequently adjusted for appropriate voltage division with the common resistor 66 for the channels "2" ... "$n$." As before, once the desired family of transfer characteristics for the frequency dependent control circuit 24 is established, the receiver automatically attains and maintains an appropriate optimum reception condition each time any station is selected by the selector switch 30.

It is observed at this point that the above-described principles of operation are not limited to television reception, but are applicable whenever a receive for any mode of transmission is adapted to receive a number of modulated carriers which differ in frequency. For any such receiver, an automatic frequency control feedback loop having a family of separately adjustable transfer characteristics may be employed to provide and maintain optimum reception for the intelligence modulated on each carrier whenever any carrier is selected for reception.

It is to be understood that the above-described arrangements are only illustrative of the principles of the present invention. Numerous modifications and adaptations thereof will be readily apparent to those skilled in the art without departing from the spirit and scope of the present invention.

I claim:

1. In combination in the forepart of a television receiver, a station selector switch, heterodyning means controlled by said switch for producing an intermediate frequency television signal which includes intermediate frequency video carrier and carrier modulation signals corresponding to a desired radio frequency television signal, an intermediate frequency amplifier connected to said heterodyning means, said intermediate frequency amplifier exhibiting a frequency dependent amplification pass band, a voltage controlled local oscillator and frequency dependent control means connecting said intermediate frequency amplifier and said voltage controlled local oscillator, said control means including means for supplying a control voltage to said voltage controlled local oscillator which represents a selectable one of a plurality of adjustable output voltage-input frequency characteristic dependent upon the frequency of said intermediate frequency signal, and switching means controlled by said station selector switch for establishing said selected output voltage-input frequency characteristic for said control voltage supplying means.

2. A combination as in claim 1 further comprising automatic gain control means connected to said intermediate frequency amplifier.

3. A combination as in claim 1 wherein said control voltage supplying means includes first reactive means, and a plurality of independently adjustable reactive means each connectable by said switching means with said first reactive means for tuning said first reactive means.

4. A combination as in claim 3 wherein said first reactive means comprises a parallel resonant circuit, and wherein each of said adjustable reactive means includes a variable capacitor selectively connected in parallel with said parallel resonant circuit by said switching means.

5. A combination as in claim 3 wherein said first reactive means includes an inductance, and wherein each of said adjustable reactive means includes a capacitor selectively connected with said inductance by said switching means.

6. A combination as in claim 3 wherein said first reactive means comprises a capacitor, and wherein each of said adjustable reactive means includes a variable inductance selectively connected to said capacitor by said switching means.

7. A combination as in claim 1 wherein said control voltage supplying means comprises circuit means having an input frequency-output voltage transfer characteristic, plural independently adjustable voltage supplying means, and means for augmenting the voltage output of said transfer characteristic circuit means with the voltage produced by a selected one of said adjustable voltage supplying means connected thereto by said switching means.

8. In combination in the forepart of a heterodyne receiver adapted to receive any desired one of a plurality of modulated carrier signals separated in frequency, carrier selecting means, heterodyning means controlled by said selecting means and including modulated carrier frequency selecting means and a controlled local oscillator for reducing the selected carrier and modulation signals to an intermediate frequency range, an intermediate frequency amplifier connected to said heterodyning means for amplifying the composite intermediate frequency signal, said amplifier exhibiting a fixed frequency dependent pass band characteristic, and frequency dependent control means connecting said intermediate frequency amplifier and said local oscillator, said frequency dependent control means including a plurality of separately adjustable means for imparting a selected one of a family of frequency input-control output transfer characteristics to the remaining portion of said frequency dependent control means when connected into an operative state, and means controlled by said selecting means for connecting a particular one of said separately adjustable means into an operative state for imparting a corresponding one of said transfer characteristics to the remaining portion of said frequency dependent control network.

9. A combination as in claim 7 further comprising automatic gain control means connected to said intermediate frequency amplifier.